US010353620B2

(12) United States Patent
Leggette et al.

(10) Patent No.: US 10,353,620 B2
(45) Date of Patent: Jul. 16, 2019

(54) LIFECYCLE MANAGEMENT OF MEMORY DEVICES

(71) Applicant: International Business Machines Corporation, Armonk, NY (US)

(72) Inventors: Wesley Leggette, Chicago, IL (US); Manish Motwani, Chicago, IL (US); Brian F. Ober, Lake in the Hills, IL (US); Jason Resch, Chicago, IL (US); Patrick A. Tamborski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/827,155

(22) Filed: Nov. 30, 2017

(65) Prior Publication Data

US 2019/0163392 A1 May 30, 2019

(51) Int. Cl.
*G06F 3/06* (2006.01)
(52) U.S. Cl.
CPC ............ *G06F 3/0649* (2013.01); *G06F 3/067* (2013.01); *G06F 3/0619* (2013.01)
(58) Field of Classification Search
CPC ..................... G06F 11/3055; G06F 11/3034
See application file for complete search history.

(56) References Cited

U.S. PATENT DOCUMENTS

| 8,930,770 | B2 | 1/2015 | Stanko |
| 9,317,350 | B2 | 4/2016 | Cher |
| 9,619,381 | B2 | 4/2017 | Camp |
| 2006/0262726 | A1* | 11/2006 | Lieuallen ............ H04L 43/0817 370/241 |
| 2014/0214447 | A1* | 7/2014 | Brooker ................. G06Q 10/10 705/2 |
| 2015/0074450 | A1 | 3/2015 | Blount |
| 2017/0192840 | A1* | 7/2017 | Jeansonne ............. G06F 11/006 |
| 2018/0246789 | A1* | 8/2018 | Koga ................... G06F 11/2205 |

* cited by examiner

*Primary Examiner* — Edward J Dudek, Jr.
(74) *Attorney, Agent, or Firm* — Edward J. Wixted, III (57) ABSTRACT

Aspects of the present invention disclose a method, computer program product, and system for determining drive health. The method includes one or more processors aggregating health data information associated with one or more memory devices in a dispersed storage network, where aggregating the health data information includes determining trends of the health data information on the dispersed storage network. The method further includes one or more processors determining health status of the dispersed storage network, where the health status is a function of the aggregated health data information associated with memory devices of the dispersed storage network. The method further includes one or more processors determining an action to execute on the dispersed storage network based on the determined health status of the dispersed storage network, wherein the action includes altering activity of the one or more memory devices on the dispersed storage network.

20 Claims, 3 Drawing Sheets

LIFECYCLE MANAGEMENT OF MEMORY DEVICES

BACKGROUND

The present invention relates generally to the field of data processing systems, and more particularly to management of memory devices.

Within a networked computing environment, such as a data center, some portions of the environment include computing systems that include various virtualization technologies. Network-attached storage (NAS) is mass storage attached to a computer which another computer can access at file level over a local area network, a private wide area network, or in the case of online file storage, over the Internet. NAS is commonly associated with the Network file system and Common Internet file system/server message block protocols.

Object storage (also known as object-based storage) is a computer data storage architecture that manages data as objects, as opposed to other storage architectures like file systems which manage data as a file hierarchy and block storage which manages data as blocks within sectors and tracks. Each object typically includes the data itself, a variable amount of metadata, and a globally unique identifier. Object storage can be implemented at multiple levels, including the device level (object storage device), the system level, and the interface level. In each case, object storage seeks to enable capabilities not addressed by other storage architectures, like interfaces that can be directly programmable by the application, a namespace that can span multiple instances of physical hardware, and data management functions like data replication and data distribution at object-level granularity.

Object-storage systems allow retention of massive amounts of unstructured data. Object storage is used for purposes, such as storing photos, songs, or files in online collaboration services or social media.

SUMMARY

According to one embodiment of the present invention, a method for determining drive health is provided. The method for determining drive health may include one or more processors aggregating health data information associated with one or more memory devices in a dispersed storage network, where aggregating the health data information includes determining trends of the health data information on the dispersed storage network. The method further includes one or more processors determining health status of the dispersed storage network, where the health status is a function of the aggregated health data information associated with memory devices of the dispersed storage network. The method further includes one or more processors determining an action to execute on the dispersed storage network based on the determined health status of the dispersed storage network, wherein the action includes altering activity of the one or more memory devices on the dispersed storage network.

DETAILED DESCRIPTION

Embodiments of the present invention recognize that a user is burdened with analyzing overall health status from multiple memory devices in an effort to understand the overall health of a system and identify potential problems with large-scale computing systems. Embodiments of the present invention recognize that as the number of memory devices used in a large-scale computing system increases, a user's ability to understand and make decisions based on the health status of an individual memory device in a large-scale computing system becomes more difficult.

Embodiments of the present invention recognize that current approaches are unable to automatically aggregate and analyze the health status of a number of different memory devices. Embodiments of the present invention recognize that there are limited, if any, mechanisms for providing an overall health status of a large-scale computing system or for providing a user with guidance related to overall functionality of the memory devices on a large-scale computing system.

Embodiments of the present invention provide a method that automatically determines health status for memory devices in a distributed storage network (DSN) and providing instructions to distributed memory devices to optimize the health status of the network.

Figure 1:
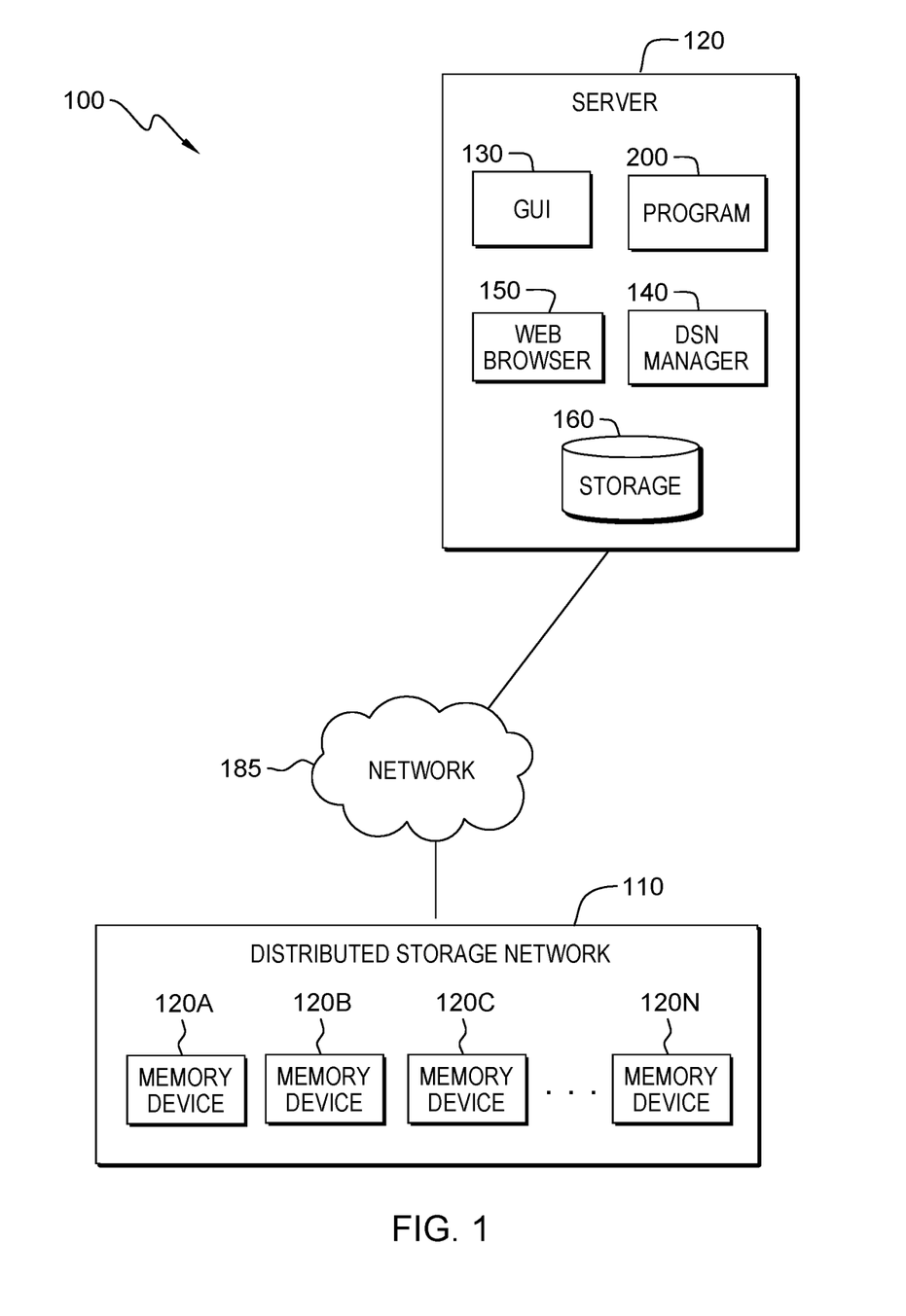
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating distributed data processing environment 100. Distributed data processing environment 100 includes distributed storage network 110, server 120, interconnected over network 185.

In an embodiment, distributed storage network 110 may include computing systems that include a plurality of interconnected physical resources not pictured (e.g., microprocessors, memory, storage devices, communication devices, etc.); a local group/cluster of computing systems, such as racks of blade servers, network-attached storage (NAS) systems, and storage area networks (SANs); distributed computing environments, such as a cloud infrastructure; or any combination thereof.

Distributed storage networks are composed of independent operating environments that use resources made up of logical divisions of physical resources, such as memory device 120A thru memory device 120N. In one embodiment, distributed storage network 110 is divided into multiple memory devices that include memory device 120A thru 120N. In an example embodiment, memory devices 120A through 120N can be representative of an external hard drive, a solid-state drive, a network attached storage device, a flash drive, an optical drive, or cloud storage. In an illustrated example, memory device 120A runs an independent operating physical environment, such as an operating system, processing unit, and memory. Memory device 120B includes an independent operating physical environment, such as an operating system, processing unit, and memory. Memory device 120C includes an independent operating physical environment, such as an operating system, processing unit, and memory. Memory device 120N includes an independent operating physical environment, such as an operating system, processing unit, and memory. Memory device 120N represents that distributed storage network 110 is capable of being composed of multiple instances of memory devices beyond what is depicted in FIG. 1.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud-computing applications. In general, server 120 is representative of any programmable electronic device or combination of programmable electronic devices capable of executing machine-readable program instructions and communicating with other computer devices via a network. In one embodiment, server 120 includes graphic user interface 130, distributed storage network manager 140, web browser 150, storage 160, and program 200.

In an embodiment, server 120 is capable of initiating a handshake process between server 120 and distributed storage network 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a message to distributed storage network 110 indicating that server 120 wants to establish a communication channel in order to gain access to programs on distributed storage network 110.

In one embodiment, graphical user interface 130 operates on server 120. In another embodiment, graphical user interface 130 operates on another computer in a server-based setting, for example on a server computer not pictured. In yet another embodiment, graphical user interface 130 operates on server 120 simultaneously with another server computer interconnected through network 185. Graphical user interface 130 may be any user interface used to access program 200. Additionally, graphical user interface 130 may be any user interface used to supply information to server 120, such as information supplied by a user to be used by program 200. In some embodiments, graphical user interface 130 may present a generic web browser used to retrieve, present, and negotiate resources from the Internet. In other embodiments, graphical user interface 130 may be a software or application that enables server 120 access to network 185.

In yet another embodiment, server 120 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of server 120. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to server 120, which may operate utilizing wired (e.g., USB port) or wireless network communications (e.g., infrared, NFC, etc.). Server 120 may include components, as depicted and described in further detail with respect to FIG. 3, in accordance with embodiments of the present invention.

Distributed storage network manager 140 (DSN 140) observes and is capable of controlling individual memory devices on distributed storage network 110. Distributed storage network manager 140 tracks things, such as disk and memory use on the memory devices located on distributed storage network 110. Distributed storage network manager 140 also carries out regular tests of services that are meant to be running. Distributed storage network manager 140 exchanges information with program 200 to assist program 200 in analyzing DSN 110. In an example, distributed storage network manager 140, using a dispersal algorithm, expands data, transforms data, slices the data and continuously disperses the data across the network of memory devices located on distributed storage network 110.

Storage 160 (e.g., a database) located on server 120, represents any type of storage device capable of storing data that is accessed and utilized by server 120. In other embodiments, storage 160 represents multiple storage devices within server 120. Storage 160 stores information such as, but not limited to, a user profile, and a history of pricing trends for various hardware. In an example, storage 160 stores information specific to a user profile, such as authentication information, permissions, and security parameters that enable a user to access one or more memory devices or other devices, not shown, located on distributed storage network 110.

In general, network 185 can be any combination of connections and protocols that will support communications among distributed storage network 110. Network 185 can include, for example, a local area network (LAN), a wide area network (WAN), such as the Internet, a cellular network, or any combination of the preceding, and can further include wired, wireless, and/or fiber optic connections.

Figure 2:
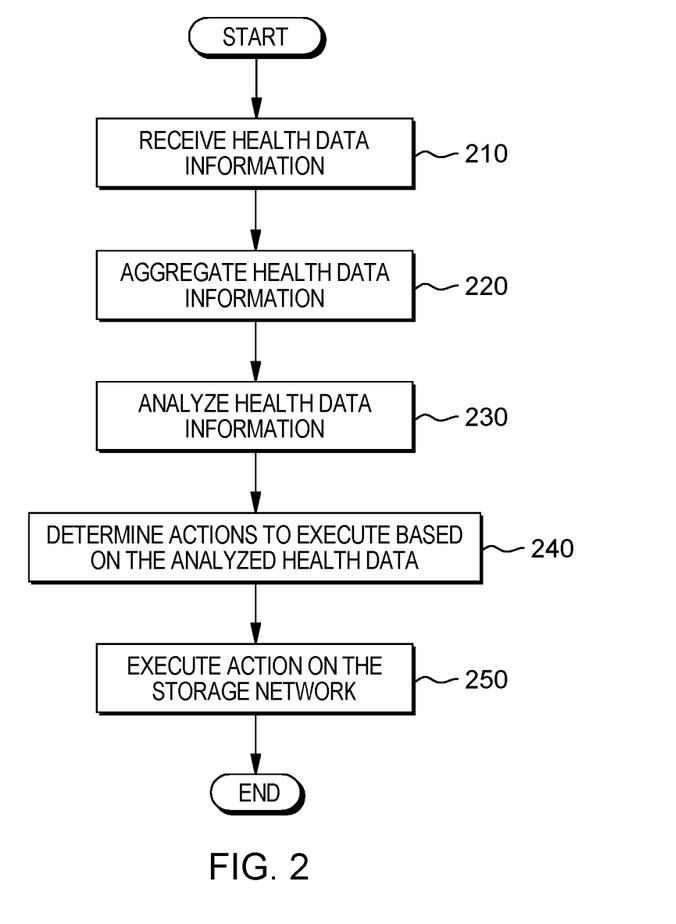
FIG. 2 illustrates the operational steps of a program to determine drive health and provide tuning instructions to optimize health status of the drive, in accordance with an embodiment of the present invention.

FIG. 2 is a flowchart depicting the operational steps of program 200, a program for determining health status for drives in a dispersed storage network and determining tuning instructions to optimize health status of the drives, in accordance with an embodiment of the present invention.

In step 210, program 200 receives health data information. In an embodiment, program 200 receives health data information from one or more drives in a distributed storage network (DSN). In an example, program 200 receives information from DSN memory and memory devices that are distributed storage network 110 (i.e., memory devices 120A through 120N). In this example, program 200 receives geographical location of the memory device, memory device vendor, model, serial number, and revision information. Program 200 receives the aforementioned information on a periodic basis. In another example, program 200 receives DSN memory and memory device algorithmic understanding of the health of one or more memory devices in distributed storage network 110. Distributed storage network manager 140 sets levels of availability of data and constantly analyzes the expanded, transformed, sliced, and dispersed data for health as a function of data reliability. DSN manager 140 analyzes the reliability of the information by determining whether the dispersal algorithm has faithfully reproduced the data among the memory devices located on distributed storage network 110. In this example, program 200 receives a report of the state of the memory device health as a function of the data analysis performed by DSN manager 140. In another embodiment, program 200 retrieves health data information that is collected and located in storage 160. In an example, storage 160 receives health data information from DSN memory devices that are part of distributed storage network 110.

In step 220, program 200 aggregates health data information. In an embodiment, program 200 aggregates the information received in step 210 to gain additional insight into memory device health trends specific to vendor, model, serial number, and revisions of the model. In this embodiment, program 200 aggregates health data information of memory device health trends, retrieved from storage 160, specific to a geographical location, application algorithmic usage of provided metrics. In an example, program 200 aggregates information, periodically reported to and collected by storage 160, from false memory device failures based on bad algorithmic behavior, missed algorithmic opportunities to detect early memory device failures, and missed device metrics that could have identified failure of one or more memory devices more appropriately. In this example, program 200 aggregates the retrieved pre-existing health data information, as received in step 210, from storage 160 and organizes the data. Program 200 organizes the aggregated data, retrieved from storage 160, to present the data in an easily discernible form. Health data may seem disparate or unrelated until the totality of the data is combined and presented in a manner that program 200 can make determinations based on the aggregated data.

In step 230, program 200 analyzes health data information. In an embodiment, program 200 leverages the health data information aggregated in step 220 to analyze the information, make determinations of the drive health, and determine how health metrics are being algorithmically used by geographically distributed DSN and memory devices. Program 200 uses a decentralized drive lifecycle protocol (DDLP) to make the determination of drive health and to make determinations how health metrics are used by the geographically distributed DSN and memory devices. A DDLP is a program, located on computing systems that are in different physical locations, that periodically collects and analyzes the health, usage, and lifecycle of a memory drive. Program 200 utilizes the DDLP, as a conduit between DSN memory and memory devices, for DSN 110 to retrieve geographical location of a memory device, memory device vendor, model, serial number, revision number, memory device usage and health metrics. DSN 110 algorithmic understanding of the health of remote memory devices, and algorithmic information of how metrics are used by DSN 110 to determine health of one or more remote memory devices.

In an example, program 200 retrieves drive health information from memory device 120A on distributed storage network 110. Program 200 determines that a specific revision of the memory device on memory device 120A is more susceptible to specific failures than other revisions after gathering, analyzing, and comparing data that program 200 interprets as being indicative of metrics that have been associated with a specific failure in the past. In another example, program 200 analyzes health data information, aggregated in step 220, of memory device health trends specific to a geographical location, and memory device algorithmic usage of provided metrics. In this example, program 200 determines that a batch of memory devices manufactured in a specific geographic location are more susceptible to a specific type of failure due to a known defect during manufacturing. In another example, program 200 analyzes information aggregated in step 220, from false memory device failures based on bad algorithmic behavior, and missed algorithmic opportunities to detect early memory device failures, and missed device metrics.

In step 240, program 200 determines actions to execute on the memory system based on the analyzed health data. In an embodiment, program 200, based on the determination made by program 200 in step 230, determines an appropriate action to respond to the determination and improve the memory device health. In an example, program 200 accesses storage 160 to determine, based on a previous false negative metric signature located on storage 160, that program 200 received a false negative of an early memory device failure. Program 200 generates a log, and stores the log on storage 160, of the missed algorithmic opportunity to detect and anticipate an early memory device failure. Program 200 determines, based on the similarity of the log to a previously stored failure to anticipate a memory device failure, that the failure was due to an incomplete device metric information that could have identified, and predicted, the identified memory device failure more appropriately. In this example, program 200 utilizes the generated log, and false negative metric signature, in conjunction with the incomplete device metric information to determine that the memory device application algorithmic usage, as provided by the incomplete metric information, to alter the drive lifecycle algorithmic behavior. Program 200 leverages the combination of information to integrate with hardware procurement systems and initiates an order of the memory devices that were determined to fail. Program 200 initiates the timing of the order of the memory devices through analyzing a history, located on storage 160, of optimal, or favorable, pricing windows.

In step 250, program 200 executes an action on the storage network. In an embodiment, program 200 integrates health data information into one or more operational systems to alter drive lifecycle algorithmic behavior, to orchestrate data migration prior to device failure, and to integrate with hardware procurement devices to proactively order devices based on an accounting of external factors, such as optimal pricing windows. In an example, program 200 applies the decentralized drive life cycle protocol (DDLP) to a smart DSN memory client to provide algorithmic tuning to the DSN memory system or a memory device. In this example, program 200 transforms the parameters of the drive lifecycle algorithm by widening the amount of data used by the drive lifecycle algorithm to increase the number of memory devices analyzed by program 200 and in effect to increase the amount of data used to analyze the overall memory device health in a distributed storage network. Program 200 provides algorithmic tuning to the memory device to aggressively interpret the metrics that are applicable to any failure of the memory device. Program 200 uses the aggregated drive metrics derived from step 220 to alter the metrics and thresholds of that program 200 algorithmically uses to determine memory device health, to predict memory device failures. In this example, program 200 analyzes the metrics, derived in an analysis from step 230, to aggressively interpret the metrics applicable to one or more failures in a DSN memory system to increase prediction probability of the failures.

In another example, program 200 utilizes information determined in step 230 to identify a memory device that is danger of failing based on an analysis of the health information of the storage device. Program 200 transforms the parameters of the drive lifecycle algorithm by widening the amount of data used by the drive lifecycle algorithm to determine if the memory device is failing as a result of bad algorithmic behavior. Program 200 determines, after transforming the algorithm, that the analysis is the same as before the algorithm transformation. Program 200 initiates a request, through server 120, to replace the individual bad memory device and initiates a request to distributed storage network manager 140 to cease operations where the information dispersal algorithm disperses data to this individual bad memory device. Program 200 initiates a request to DSN manager 140 to migrate the data located on the bad memory device to be dispersed via the information dispersal algorithm across one a network of one or more memory devices in a distributed storage network.

In another example, program 200 utilizes the information determined in step 230 that is specific to devices manufactured in a specific location to alter the DSN memory or memory devices to more aggressively handle the drives or to begin to operationally take the drives offline and out of service. In this example, program 200 accesses information from a plurality of distributed storage networks and determines that the serial numbers, and models of the memory devices suggest that the memory devices are of the same manufacture origin and are similarly deposed and susceptible to an acknowledged and noted design defect. Program 200 determines that the health trends, design defect, specific to the memory device model are unable to be repaired and, as detailed in storage 160, result in total system catastrophe. Program 200 leverages this information to send a message to one or more servers and to deactivate the one or more distributed storage networks that program 200 identified as containing the affected memory devices.

In another example, program 200 applies the DDLP and integrates the data into an operational system. In this example, program 200 utilizes information derived in step 230 to inform vendors of specific trends regarding memory device health and failures for specific models, revisions, geographical locations, manufacturing origins, and possible device driver issues. Program 200 uses this information to provide suggestions to a vendor so that the vendor can improve their supply chain and procurement processes. In this example, program 200 could inform memory device service providers of projected failure events and program 200 can automatically initiate a replacement device ordering based on the projected failure. Program 200 utilizes information analyzed in step 230 to determine that a chosen course of action could result in a reduced probability of data loss and service outage. In this example, program 200 uses this information to inform industry analysts regarding inter-vendor health trends, data usage, and perceived product quality.

Figure 3:
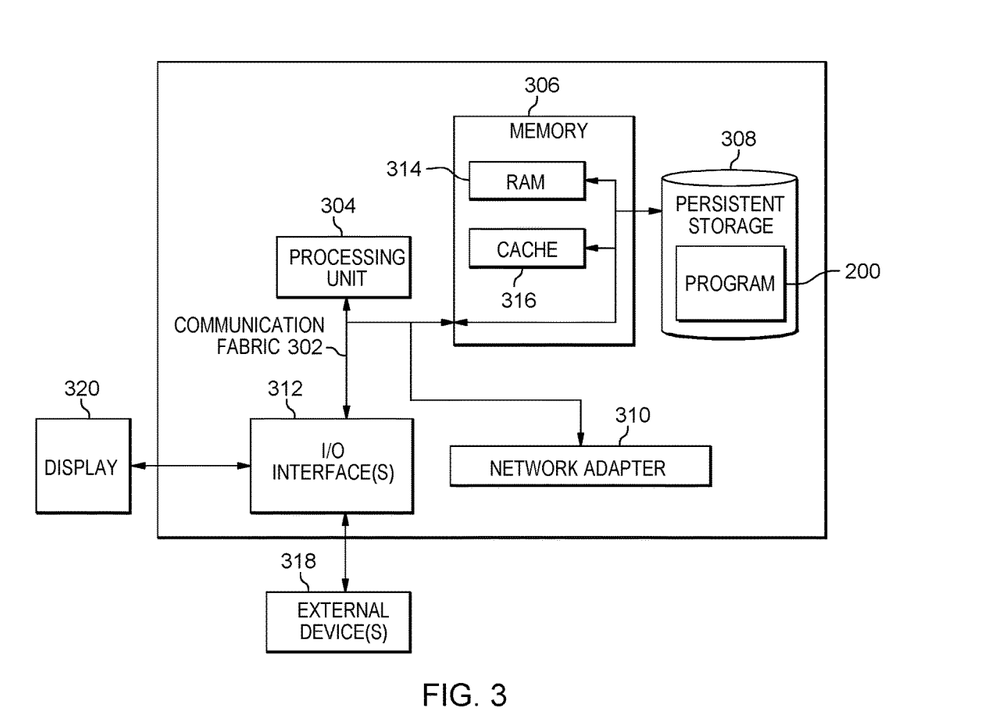
FIG. 3 is a block diagram of components of a computer system, such as the server computer of FIG. 1, in accordance with an embodiment of the present invention.

FIG. 3 depicts a block diagram of components of server 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 120 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Program 200 may be stored in persistent storage 308 and in memory 306 for execution by one or more of the respective computer processors 304 via cache 306. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program 200 may be downloaded to persistent storage 308 through communications unit 310.

I/O interface(s) 312 allows for input and output of data with other devices that may be connected to server computer 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., cognitive bespoke program 200, can be stored on such portable computer readable storage media and can be loaded onto persistent storage 308 via I/O interface(s) 312. I/O interface(s) 312 also connect to a display 320. Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining drive health, the method comprising:
    aggregating, by one or more processors, health data information associated with one or more memory devices in a dispersed storage network, wherein aggregating the health data information includes determining trends of the health data information that are specific to a geographical location, a vendor, a model, a serial number, and updated revisions of the model on the dispersed storage network;

determining, by one or more processors, health status of the dispersed storage network, wherein the health status is a function of the aggregated health data information associated with memory devices of the dispersed storage network; and determining, by one or more processors, an action to execute on the dispersed storage network based on the determined health status of the dispersed storage network, wherein the action includes altering activity of the one or more memory devices on the dispersed storage network.

2. The method of claim 1, wherein the health data information is selected from the group consisting of:

memory device usage and health metrics, algorithmic information on how metrics are used by the memory device, memory device algorithmic determinations of health of the memory device, and hosted computing system reports of memory device health.

3. The method of claim 1, wherein determining health status of the dispersed network further comprises:

determining, by one or more processors, a memory device health status of a memory device in the dispersed storage network based on data associated with the memory device, the data including health characteristics specific to a vendor, a model, a serial number, a geographical location, and a revision of the memory device.

4. The method of claim 1, wherein aggregating health data information further comprises:

determining, by one or more processors, a health trend of a memory device in the dispersed storage network based on data associated with the memory device, the data including health characteristics specific to a vendor, a model, a serial number, a geographical location, and a revision of the memory device.

5. The method of claim 1, wherein determining an action to execute on the dispersed storage network based on the determined health status of the dispersed storage network further comprises:

determining, by one or more processors, a memory device of the one or more memory devices on the dispersed storage network that is susceptible of failure; and directing, by one or more processors, the dispersed storage network to initiate removal of the memory device that is susceptible from the dispersed storage networks.

6. The method of claim 1, wherein determining an action to execute on the dispersed storage network based on the determined health status of the dispersed storage network further comprises:

determining, by one or more processors, a projected failure of a memory device on the dispersed storage network;

alerting, by one or more processors, one or more vendors of the memory device of information including specific trends regarding the memory device health, failures for specific models, revisions, and geographical information; and initiating, by one or more processors, ordering of a replacement memory device based on the projected failure of the memory device.

7. The method of claim 1, wherein determining an action to execute on the dispersed storage network based on the determined health status of the dispersed storage network further comprises:

determining, by one or more, that a failure of a memory devices of the dispersed storage network is based on algorithmic behavior of the memory devices by comparing the algorithmic behavior of the memory device to a history of a signature of false memory device failures; and generating, by one or more processors, tuning instructions for the memory device, wherein the tuning instructions transform parameters of a drive lifecycle algorithm by increasing an amount of data used by the drive lifecycle algorithm.

8. A computer program product for determining drive health, the computer program product comprising:

one or more computer readable tangible storage media and program instructions stored on at least one of the one or more computer readable storage media, the program instructions readable/executable by one or more computer processors and further comprising:

program instructions to aggregate health data information associated with one or more memory devices in a dispersed storage network, wherein aggregating the health data information includes determining trends of the health data information that are specific to a geographical location, a vendor, a model, a serial number, and updated revisions of the model on the dispersed storage network;

program instructions to determine health status of the dispersed storage network, wherein the health status is a function of the aggregated health data information associated with memory devices of the dispersed storage network; and program instructions to determine an action to execute on the dispersed storage network based on the determined health status of the dispersed storage network, wherein the action includes altering activity of the one or more memory devices on the dispersed storage network.

9. The computer program of claim 8, wherein the health data information is selected from the group consisting of:

memory device usage and health metrics, algorithmic information on how metrics are used by the memory device, memory device algorithmic determinations of health of the memory device, and hosted computing system reports of memory device health.

10. The computer program of claim 8, wherein the program instructions to determine health status of the dispersed network further comprises program instructions, stored on the one or more computer readable storage media, which when executed by a processor, cause the processor to:

determine a memory device health status of a memory device in the dispersed storage network based on data associated with the memory device, the data including health characteristics specific to a vendor, a model, a serial number, a geographical location, and a revision of the memory device.

11. The computer program of claim 8, wherein the program instructions to aggregate health data information further comprises program instructions, stored on the one or more computer readable storage media, which when executed by a processor, cause the processor to:

determine a health trend of a memory device in the dispersed storage network based on data associated with the memory device, the data including health characteristics specific to a vendor, a model, a serial number, a geographical location, and a revision of the memory device.

12. The computer program of claim 8, wherein the program instructions to determine an action to execute on the dispersed storage network based on the determined health status of the dispersed storage network further comprises program instructions, stored on the one or more computer readable storage media, which when executed by a processor, cause the processor to:
  determine a memory device of the one or more memory devices on the dispersed storage network that is susceptible of failure; and
  direct the dispersed storage network to initiate removal of the memory device that is susceptible from the dispersed storage networks.

13. The computer program of claim 8, wherein the program instructions to determine an action to execute on the dispersed storage network based on the determined health status of the dispersed storage network further comprises program instructions, stored on the one or more computer readable storage media, which when executed by a processor, cause the processor to:
  determine a projected failure of a memory device on the dispersed storage network;
  alert one or more vendors of the memory device of information including specific trends regarding the memory device health, failures for specific models, revisions, and geographical information; and
  initiate ordering of a replacement memory device based on the projected failure of the memory device.

14. The computer program of claim 8, wherein the program instructions to determine an action to execute on the dispersed storage network based on the determined health status of the dispersed storage network further comprises program instructions, stored on the one or more computer readable storage media, which when executed by a processor, cause the processor to:
  determine that a failure of a memory devices of the dispersed storage network is based on algorithmic behavior of the memory devices by comparing the algorithmic behavior of the memory device to a history of a signature of false memory device failures; and
  generate tuning instructions for the memory device, wherein the tuning instructions transform parameters of a drive lifecycle algorithm by increasing an amount of data used by the drive lifecycle algorithm.

15. A computer system for determining drive health, the computer system comprising:
  one or more computer processors;
  one or more computer readable storage media; and
  program instructions stored on the one or more computer readable storage media for execution by at least one of the one or more computer processors, the program instructions comprising:
  program instructions to aggregate health data information associated with one or more memory devices in a dispersed storage network, wherein aggregating the health data information includes determining trends of the health data information that are specific to a geographical location, a vendor, a model, a serial number, and updated revisions of the model on the dispersed storage network;
  program instructions to determine health status of the dispersed storage network, wherein the health status is a function of the aggregated health data information associated with memory devices of the dispersed storage network; and
  program instructions to determine an action to execute on the dispersed storage network based on the determined health status of the dispersed storage network, wherein the action includes altering activity of the one or more memory devices on the dispersed storage network.

16. The computer system of claim 15, wherein the health data information is selected from the group consisting of:
  memory device usage and health metrics, algorithmic information on how metrics are used by the memory device, memory device algorithmic determinations of health of the memory device, and hosted computing system reports of memory device health.

17. The computer system of claim 15, wherein the program instructions to determine health status of the dispersed network further comprises program instructions, stored on the one or more computer readable storage media, which when executed by a processor, cause the processor to:
  determine a memory device health status of a memory device in the dispersed storage network based on data associated with the memory device, the data including health characteristics specific to a vendor, a model, a serial number, a geographical location, and a revision of the memory device.

18. The computer system of claim 15, wherein the program instructions to aggregate health data information further comprises program instructions, stored on the one or more computer readable storage media, which when executed by a processor, cause the processor to:
  determine a health trend of a memory device in the dispersed storage network based on data associated with the memory device, the data including health characteristics specific to a vendor, a model, a serial number, a geographical location, and a revision of the memory device.

19. The computer system of claim 15, wherein the program instructions to determine an action to execute on the dispersed storage network based on the determined health status of the dispersed storage network further comprises program instructions, stored on the one or more computer readable storage media, which when executed by a processor, cause the processor to:
  determine a memory device of the one or more memory devices on the dispersed storage network that is susceptible of failure; and
  direct the dispersed storage network to initiate removal of the memory device that is susceptible from the dispersed storage networks.

20. The computer system of claim 15, wherein the program instructions to determine an action to execute on the dispersed storage network based on the determined health status of the dispersed storage network further comprises program instructions, stored on the one or more computer readable storage media, which when executed by a processor, cause the processor to:
  determine a projected failure of a memory device on the dispersed storage network;
  alert one or more vendors of the memory device of information including specific trends regarding the memory device health, failures for specific models, revisions, and geographical information; and
  initiate ordering of a replacement memory device based on the projected failure of the memory device.

* * * * *